United States Patent
Ogawa et al.

(10) Patent No.: US 7,500,417 B2
(45) Date of Patent: Mar. 10, 2009

(54) HIGH-STRENGTH CONNECTING ROD AND METHOD OF PRODUCING SAME

(75) Inventors: Junpei Ogawa, Tokyo (JP); Tomonori Miyazawa, Kanagawa (JP); Yoshio Okada, Kanagawa (JP); Jun Ikeuchi, Yokohama (JP); Masashi Yamaguchi, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 585 days.

(21) Appl. No.: 10/771,522

(22) Filed: Feb. 5, 2004

(65) Prior Publication Data

US 2004/0159180 A1 Aug. 19, 2004

(30) Foreign Application Priority Data

| Feb. 19, 2003 | (JP) | ............................. 2003-041360 |
| Mar. 25, 2003 | (JP) | ............................. 2003-082505 |
| May 23, 2003 | (JP) | ............................. 2003-146734 |

(51) Int. Cl.
 *F16C 7/00* (2006.01)
 *F02B 75/32* (2006.01)
 *B21D 53/84* (2006.01)
 *B23P 17/00* (2006.01)

(52) U.S. Cl. ................. 74/579 E; 74/579 R; 123/197.3; 29/888.09

(58) Field of Classification Search ................. 74/579 E, 74/579 R; 419/14; 29/888.09; 123/197.3
See application file for complete search history.

(56) References Cited

U.S. PATENT DOCUMENTS

| 4,691,590 | A | * | 9/1987 | Geringer et al. ........... 74/579 E |
| 4,827,795 | A | * | 5/1989 | Machida et al. ........... 74/579 E |
| 5,048,368 | A | * | 9/1991 | Mrdjenovich et al. ..... 74/579 E |
| 5,485,765 | A | * | 1/1996 | Khatiblou ................. 74/579 E |
| 5,516,483 | A | * | 5/1996 | Shivanath et al. ............. 419/14 |
| 5,660,086 | A | * | 8/1997 | Carey ....................... 74/579 E |

(Continued)

FOREIGN PATENT DOCUMENTS

CN 2315345 Y 4/1999

(Continued)

OTHER PUBLICATIONS

Mechanical Design and Systems Handbook, Harold A. Rothbart, McGrawHill Book Company, 1964, pp. 17-1-17-32.*

(Continued)

*Primary Examiner*—Vinh T. Luong
(74) *Attorney, Agent, or Firm*—Foley & Lardner LLP

(57) ABSTRACT

A connecting rod of an internal combustion engine, comprising a connecting beam section serving as a main body of the connecting rod. Big and small ends are located at the opposite ends of the connecting beam section. A first joining section is located between the connecting beam section and the big end to connect the connecting beam section and the big end. A second joining section is located between the connecting beam section and the small end to connect the connecting beam section and the small end. In this connecting rod, each of the first and second joining sections gradually and continuously decreases in cross sectional area toward the connecting beam section and has a strength distribution in which a strength increases with a decrease in the cross sectional area.

28 Claims, 13 Drawing Sheets

U.S. PATENT DOCUMENTS

| | | | | |
|---|---|---|---|---|
| 5,737,976 | A | * | 4/1998 | Haman ...................... 74/579 E |
| 6,055,884 | A | * | 5/2000 | Lantz et al. ................ 74/579 E |
| 2004/0154578 | A1 | * | 8/2004 | Weaver .................... 123/197.3 |

FOREIGN PATENT DOCUMENTS

| | | | |
|---|---|---|---|
| JP | 59-89720 A | | 5/1984 |
| JP | 06-264816 A | | 9/1994 |
| JP | 9-256858 A | | 9/1997 |
| JP | 10-306317 | * | 11/1998 |
| JP | 2000-328183 | * | 11/2000 |
| JP | 2002-501829 A | | 1/2002 |

OTHER PUBLICATIONS

"Carbon Steels for Machine Structural Use", Japanese Industrial Standard (JIS), 1979, pp. 1-10, vol. JIS G 4051, Japanese Standards Association, Japan.

"Method of hardenability test for steel (End quenching method)", Japanese Industrial Standard (JIS), 1998, pp. 1-9, vol. JIS G 0561, Japanese Standards Association, Japan.

* cited by examiner

HIGH-STRENGTH CONNECTING ROD AND METHOD OF PRODUCING SAME

BACKGROUND OF THE INVENTION

This invention relates to improvements in a connecting rod and in a method of producing the connecting rod.

In a conventional producing method for a connecting, first a working piece is formed to have a Brinell hardness of not higher than 300 in order to improve machinability and fatigue durability. Thereafter, a portion which will not be subjected to machining is hardened to have a Brinell harness of not lower than 300. This is disclosed in Japanese Patent Provisional Publication No. 59-89720.

SUMMARY OF THE INVENTION

However, a strength sharply changes at a joining section between the hardened portion and the unhardened portion, so that it is difficult to obtain a sufficient buckling strength. On the other hand, in case that hardening is made throughout a wide range of area of the work piece in order to obtain a necessary buckling strength, there arises a problem that machinability is degraded at a portion which is to be machined.

It is, therefore, an object of the present invention to provide an improved connecting rod and an improved producing method for the connecting rod, by which drawbacks encountered in conventional techniques can be overcome.

Another object of the present invention is to provide an improved connecting rod and an improved producing method for the connecting rod, which can provide a high-strength connecting rod which is high in machinability and buckling strength.

A further object of the present invention is to provide an improved connecting rod and an improved producing method for the connecting rod, which provide a high-strength connecting rod which is high in fatigue strength while achieving a weight-lightening of the connecting rod.

A first aspect of the present invention resides in a connecting rod comprising a connecting beam section serving as a main body of the connecting rod. A big end is located at a first end side of the connecting beam section. A small end is located at a second end side of the connecting beam section, the second end side being axially opposite to the first end side. A first joining section is located between the connecting beam section and the big end to connect the connecting beam section and the big end. A second joining section is located between the connecting beam section and the small end to connect the connecting beam section and the small end. In this connecting rod, each of the first and second joining sections gradually and continuously decreases in cross sectional area toward the connecting beam section and has a strength distribution in which a strength increases with a decrease in the cross sectional area.

A second aspect of the present invention resides in a method of producing a connecting rod including a connecting beam section serving as a main body of the connecting rod; a big end located at a first end side of the connecting beam section; a small end located at a second end side of the connecting beam section, the second end side being axially opposite to the first end side; a first joining section located between the connecting beam section and the big end to connect the connecting beam section and the big end; and a second joining section located between the connecting beam section and the small end to connect the connecting beam section and the small end. The producing method comprising (a) gradually and continuously decreasing each of the first and second joining sections in cross sectional area toward the connecting beam section; and (b) providing to each of the first and second joining sections a strength distribution in which a strength increases with a decrease in the cross sectional area.

A third aspect of the present invention resides in a high-strength connecting rod comprising a connecting beam section serving as a main body of the connecting rod, the connecting beam section having a portion which is the smallest in cross sectional area throughout the connecting rod. A big end is located at a first end side of the connecting beam section. A small end is located at a second end side of the connecting beam section, the second end side being axially opposite to the first end side. A first joining section is located between the connecting beam section and the big end to connect the connecting beam section and the big end. A second joining section is located between the connecting beam section and the small end to connect the connecting beam section and the small end. In this connecting rod, each of the first and second joining sections gradually and continuously decreases in cross sectional area toward the connecting beam section. Additionally, a portion which is the lowest in fatigue strength exists in at least one of the big and small ends, and a portion which varies in fatigue strength exists in each of the first and second joining sections and in the connecting beam sections. Further, a product of the cross sectional area and the fatigue strength at a cross section of each of the joining and connecting beam sections is equal to or greater than a product of the cross sectional area and the fatigue strength in the smallest cross sectional area portion in the connecting beam section.

A fourth aspect of the present invention resides in a high-strength connecting rod comprising a connecting beam section serving as a main body of the connecting rod, the connecting beam section having a portion which is the smallest in cross sectional area throughout the connecting rod. A big end is located at a first end side of the connecting beam section. A small end is located at a second end side of the connecting beam section, the second end side being axially opposite to the first end side. A first joining section is located between the connecting beam section and the big end to connect the connecting beam section and the big end. A second joining section is located between the connecting beam section and the small end to connect the connecting beam section and the small end. In this connecting rod, each of the first and second joining sections gradually and continuously decreases in cross sectional area toward the connecting beam section. Additionally, a cross section of each of the connecting beam section and each of the first and second joining sections includes at least one of martensitic structure and ferritic-pearlitic structure and satisfies the following expression:

$$S/D \geq 1/\{(1-\beta)Ms/100+\beta\} \qquad \text{Eq.(1)}$$

where S is a cross sectional area of any portion of each of the connecting beam section and each of the first and second joining sections; D is a cross sectional area of the smallest cross sectional area portion of the connecting beam section; $\beta$ is a fatigue strength of an unhardened structure/a fatigue structure of a tempered martensitic structure; Ms is a proportion of area of the tempered martensitic structure in the portion whose sectional area is S. Further, a whole cross section of the smallest cross sectional area portion is formed of the tempered martensitic structure.

A fifth aspect of the present invention resides in a method of producing a high-strength connecting rod comprising: a connecting beam section serving as a main body of the connecting rod, the connecting beam section having a portion which is the smallest in cross sectional area throughout the connecting rod; a big end located at a first end side of the connecting beam section; a small end located at a second end side of the connecting beam section, the second end side being axially opposite to the first end side; a first joining section located between the connecting beam section and the big end to connect the connecting beam section and the big end; a second joining section located between the connecting beam section and the small end to connect the connecting beam section and the small end; wherein each of the first and second joining sections gradually and continuously decreases in cross sectional area toward the connecting beam section; wherein a portion which is the lowest in fatigue strength exists in at least one of the big and small ends, and a portion which varies in fatigue strength exists in each of the first and second joining sections and in the connecting beam sections; wherein a product of the cross sectional area and the fatigue strength at a cross section of each of the joining and connecting beam sections is equal to or greater than a product of the cross sectional area and the fatigue strength in the smallest cross sectional area portion in the connecting beam section. The producing method comprises (a) forming a material steel into a shape of the connecting rod; (b) hardening the material steel having the connecting rod shape by using induction current; and (c) tempering the hardened material steel at a temperature ranging from 200 to 650° C.

DETAILED DESCRIPTION OF THE INVENTION

First and second embodiments of a connecting rod according to the present invention will be discussed with reference to FIGS. 1 to 19.

The inventive concept for the first and second embodiments reside in A first aspect of the present invention resides in a connecting rod comprising a connecting beam section serving as a main body of the connecting rod. A big end is located at a first end side of the connecting beam section. A small end is located at a second end side of the connecting beam section, the second end side being axially opposite to the first end side. A first joining section is located between the connecting beam section and the big end to connect the connecting beam section and the big end, a second joining section is located between the connecting beam section and the small end to connect the connecting beam section and the small end. In this connecting rod, each of the first and second joining sections gradually and continuously decreases in cross sectional area toward the connecting beam section and has a strength distribution in which a strength increases with a decrease in the cross sectional area.

Figure 1:
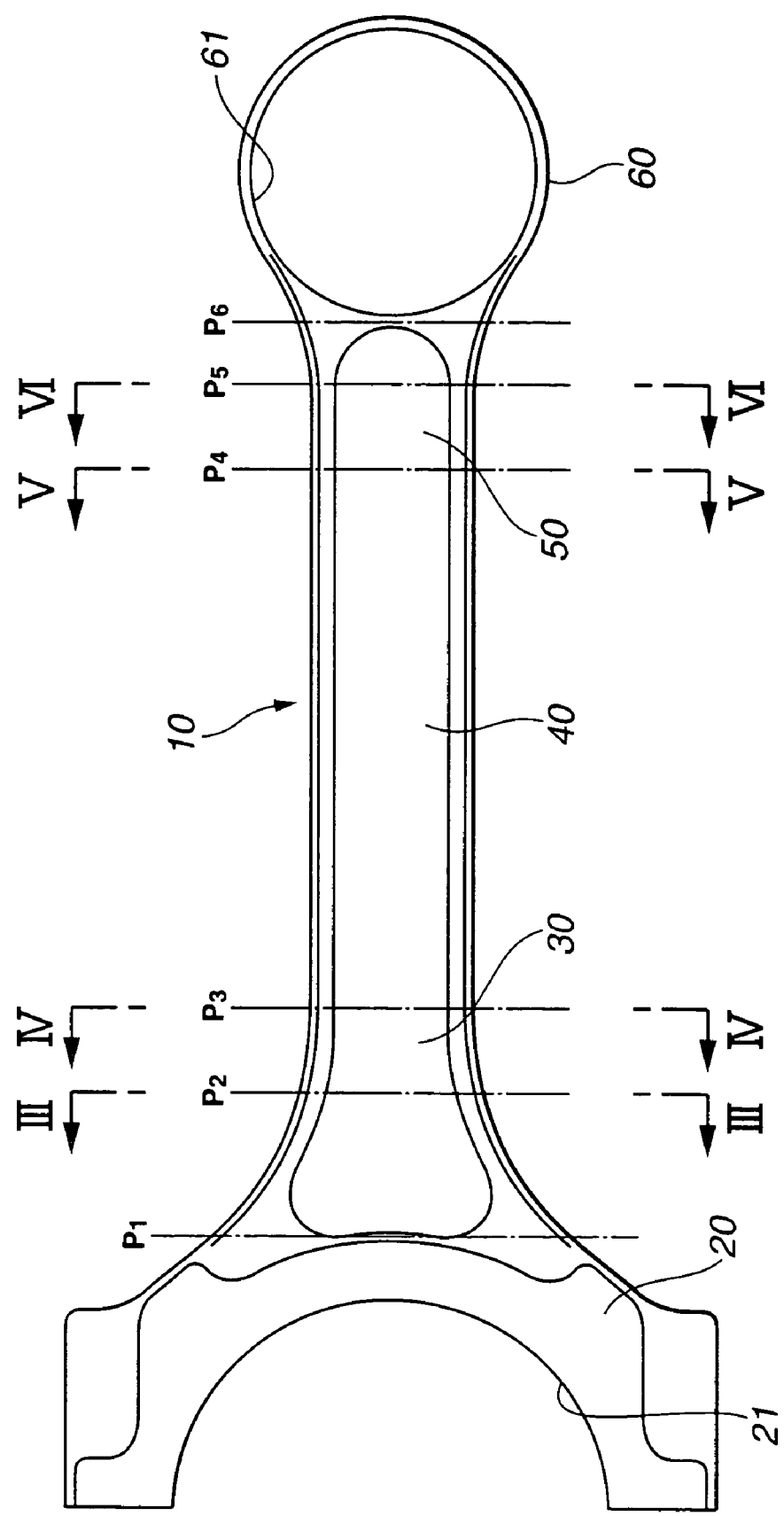
FIG. 1 is a plan view of a first embodiment of a connecting rod according to the present invention.

FIG. 1 is a top plan view of a connecting rod according to a first embodiment of this invention. Connecting rod 10 according to the first embodiment is used for connecting a piston in an internal combustion engine and a crankshaft and transmitting the reciprocal motion of the piston to the crankshaft.

Connecting rod 10 is made of, for example, carbon steel and has a connecting beam section 40 forming a main body, a big end 20 situated at one end of connecting beam section 40 and a small end 60 situated at the other end of connecting beam section 40. Connecting beam section 40 has an I-shaped cross section and is substantially uniform in shape.

Big end 20 is of the split type and has a generally semicylindrical portion 21 with which a connecting rod cap (not shown) is assembled by means of, for example, bolts for connection with a crankshaft pin (or connecting rod journal of the crankshaft)(not shown). Small end 60 has an opening 61 for connecting a piston pin (not shown). Joining sections 30 and 50 are formed between big end 20 and connecting beam section 40 and between connecting beam section 40 and small end 60, respectively.

Figure 2:
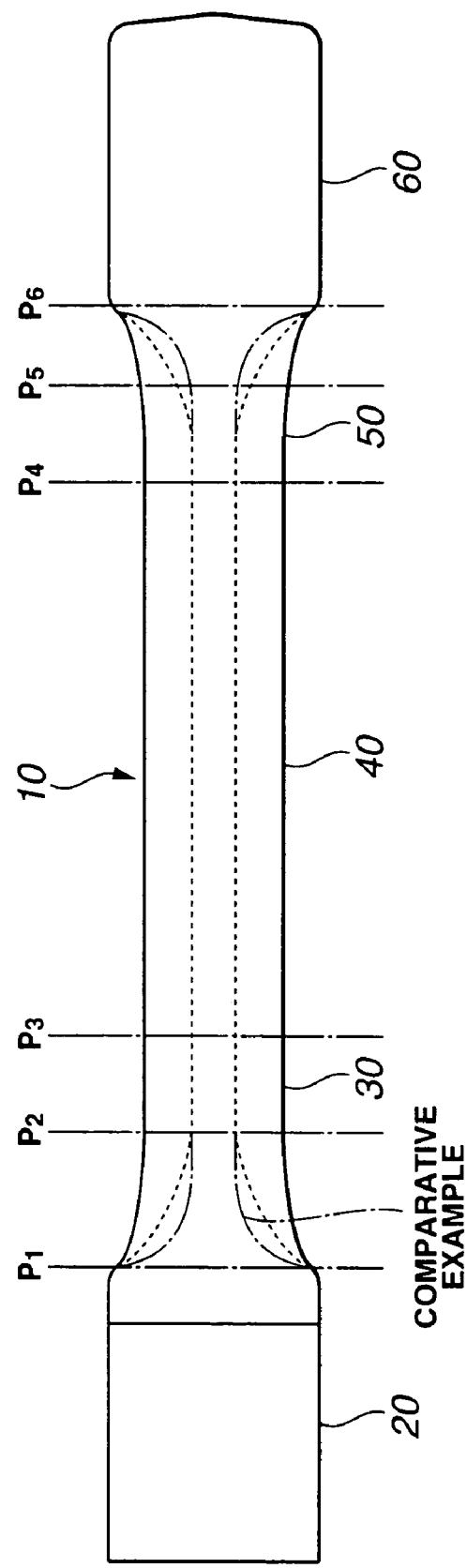
FIG. 2 is a side elevation of the connecting rod of FIG. 1.
Figure 3:
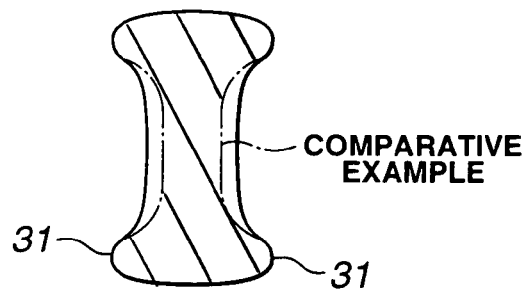
FIG. 3 is a sectional view taken along the line III-III of FIG. 1.
Figure 4:
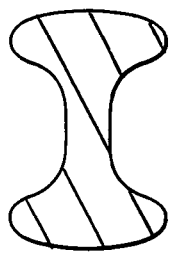
FIG. 4 is a sectional view taken along the line IV-IV of FIG. 1.
Figure 5:
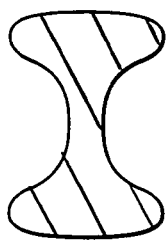
FIG. 5 is a sectional view taken along the line V-V of FIG. 1.
Figure 6:
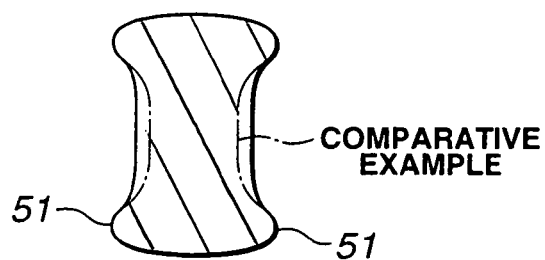
FIG. 6 is a sectional view taken along the line VI-VI of FIG. 1.

FIG. 2 is a side elevational view of the connecting rod shown in FIG. 1, FIG. 3 is a sectional view taken along line III-III of FIG. 1, FIG. 4 is a sectional view taken along line IV-IV of FIG. 1, FIG. 5 is a sectional view taken along line V-V of FIG. 1 and FIG. 6 is a sectional view taken along line VI-VI of FIG. 1.

Joining section 30 has a cross sectional area decreasing continuously toward connecting beam section 40. For example, the cross sectional area across boundary $P_2$ between big end 20 and joining section 30 (see FIG. 3) is about 1.5 times the cross sectional area across boundary $P_3$ between joining section 30 and connecting beam section 40 (see FIG. 3).

Joining section 30 has in its concave portion 31 a thickness which is larger than in a comparative example (a conventional connecting rod), as shown in FIGS. 3 and 6. A portion of big end 20 adjoining joining section 30 is also larger than the shape of the comparative example, as shown in FIG. 2, so that a transitory portion from big end 20 to joining section 30 may have a gradually varying cross sectional area.

As connecting beam section 40 is substantially uniform in shape, its cross sectional area across boundary $P_3$ between joining section 30 and connecting beam section 40 (see FIG. 4) is equal to its cross sectional area across boundary $P_4$ between connecting beam section 40 and joining section 50 (see FIG. 5).

Joining section 50 has a cross sectional area decreasing continuously toward connecting beam section 40, as joining section 30 does. For example, the cross sectional area across boundary $P_5$ between joining section 50 and small end 60 (see FIG. 6) is about 1.5 times the cross sectional area across boundary $P_4$ between connecting beam section 40 and joining section 50 (see FIG. 5).

Joining section 50 has in its concave portion 51 a thickness which is larger than in the shape of the comparative example. A portion of small end 60 adjoining joining section 50 is also larger than in the shape of the comparative example, as shown clearly in FIG. 2, so that a transitory portion from small end 60 to joining section 40 may have a gradually varying cross sectional area.

Connecting beam section 40 is substantially uniform in strength. On the other hand, joining sections 30 and 50 have a gradually varying strength increasing toward connecting beam section 40. In other words, joining sections 30 and 50 have a strength distribution in which their strength increases with a decrease in cross sectional area.

Figure 7:
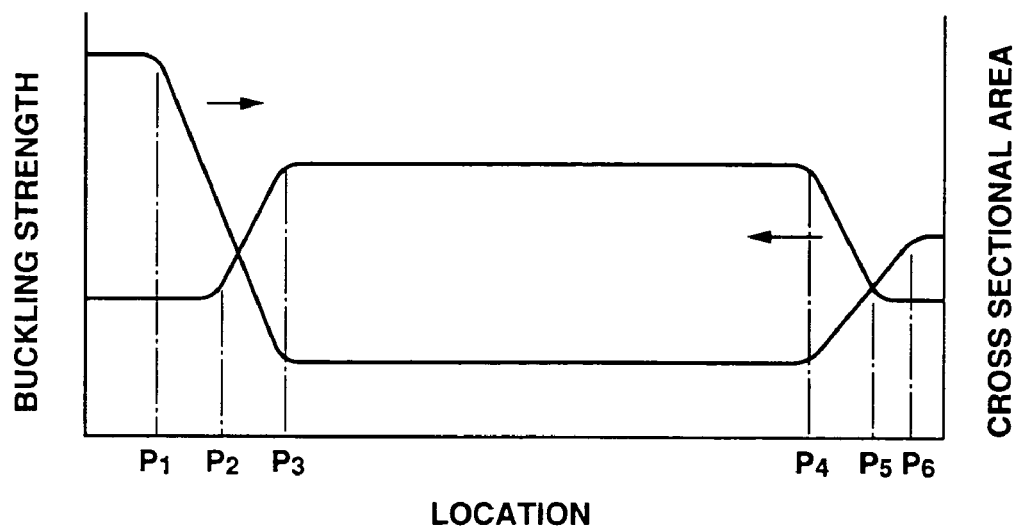
FIG. 7 is a graph showing the relationship between the cross sectional area and the buckling strength of the connecting rod of the first embodiment.

FIG. 7 is a graph showing the buckling strength of connecting rod 10 in relation to its cross sectional area. As shown therein, the cross sectional area of connecting rod 10 decreases from boundary $P_1$ between semi-circular portion 21 of big end 20 and boundary $P_2$ to boundary $P_3$, is uniform in connecting beam section 40 and increases from boundary $P_4$ to boundary $P_6$ situated close to opening 61 of small end 60.

On the other hand, its buckling strength is substantially uniform to boundary $P_2$, increases from boundary $P_2$ to boundary $P_3$, is uniform in connecting beam section 40, decreases from boundary $P_4$ to boundary $P_5$ and is substantially uniform from boundary $P_5$.

In other words, its buckling strength varies in conformity with the strength of joining sections 30 and 50 and is high in its portions having a small cross sectional area. On the other hand, its big and small ends 20 and 60 are relatively low in strength and are, therefore, not low in machinability.

Thus, it is possible according to the first embodiment of the present invention to provide a high-strength connecting rod having good machinability and buckling strength.

The strength distribution of the joining sections can be formed by, for example, controlling hardening by heat treatment (hardening), so that a distribution may be produced in the hardening temperature and/or tempering time during the quenching of the joining sections. In this connection, it is preferable from the standpoints of machinability and buckling strength that connecting beam section 40 is thoroughly hardened, while big and small ends 20 and 60 are substantially not hardened.

Figure 8:
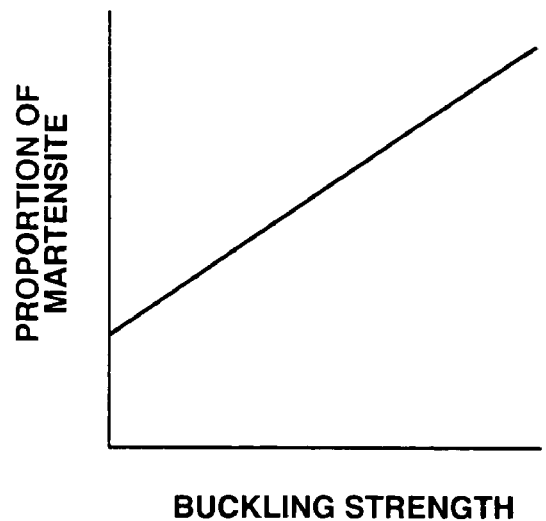
FIG. 8 is a graph showing the relationship between the proportion of martensite and the buckling strength in connection with the connecting rod of the first embodiment.
Figure 9:
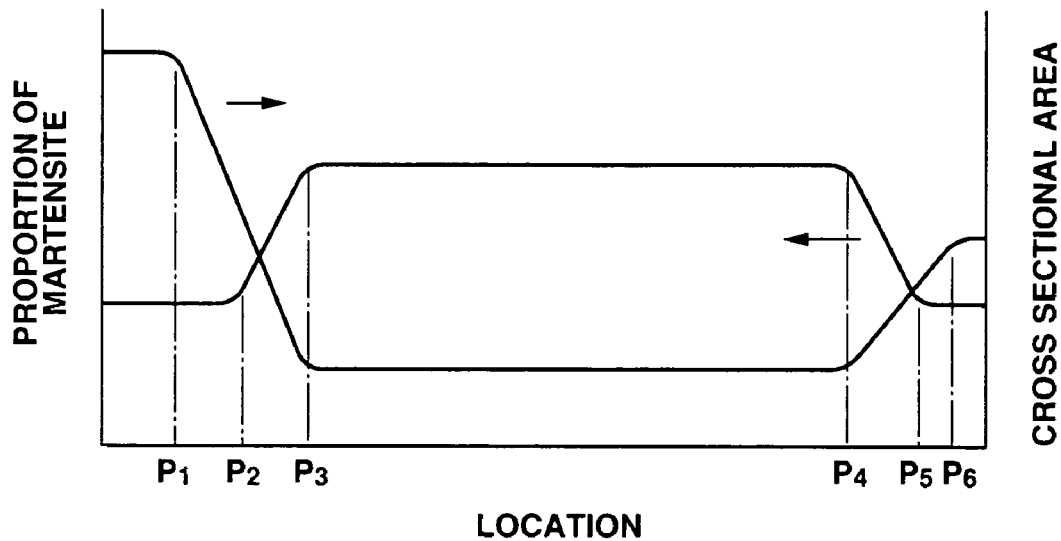
FIG. 9 is a graph showing the relationship between the cross sectional area and the proportion of martensite upon hardening, in connection with the connecting rod of the first embodiment.

The proportion of martensite corresponds to the buckling strength, as shown in FIG. 8. Therefore, when the proportion of martensite Ms (%) in a joining section varies continuously with a variation in the cross sectional area D of the joining section so as to satisfy the relation $D/D_{min} \geq 1/((1-\alpha) \times Ms/100 + \alpha)$, it is possible to ensure the realization of a strength distribution conforming to the variation in cross sectional area.

In the expression, $D_{min}$ is the minimum value of cross sectional area of the joining section and $\alpha$ is the value obtained by dividing the buckling stress without hardening by the buckling stress with hardening.

Figure 10:
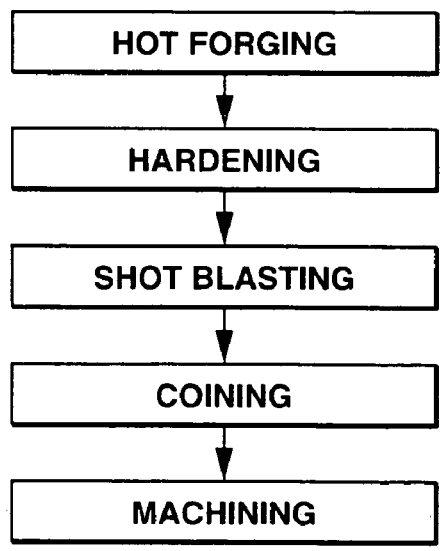
FIG. 10 is a flow diagram for explaining a producing method for the connecting rod of the first embodiment.

Description will now be made of a process for manufacturing a connecting rod according to the first embodiment of the present invention. The process for manufacturing a connecting rod according to the first embodiment of the present invention includes the steps of hot forging, hardening, shot blasting, coining and machining, as shown in FIG. 10.

During the step of hot forging, a steel material is formed into the shape of a connecting rod at a temperature not lower than its recrystallization temperature (for example, 800 to 1200° C.) to make a half-finished (or incompletely finished) connecting rod. The steel material is, for example, carbon steel (for example, S40C to S50C according to Japanese Industrial. Standard (JIS)).

When the connecting beam and joining sections of the half-finished connecting rod are hardened during the step of hardening, a distribution (for example, a gradient) is produced in the hardening temperature for the joining sections to control the effect of their hardening.

For example, a strength (hardness) distribution conforming to a variation in cross sectional area is formed in the joining sections by producing a distribution in the hardening temperature for the joining sections so that the proportion of martensite Ms (%) in the joining sections may vary continuously with a variation in the cross sectional area D of the joining sections so as to satisfy the relation $D/D_{min} \geq 1/((1-\alpha) \times Ms/100 + \alpha)$.

Figure 11:
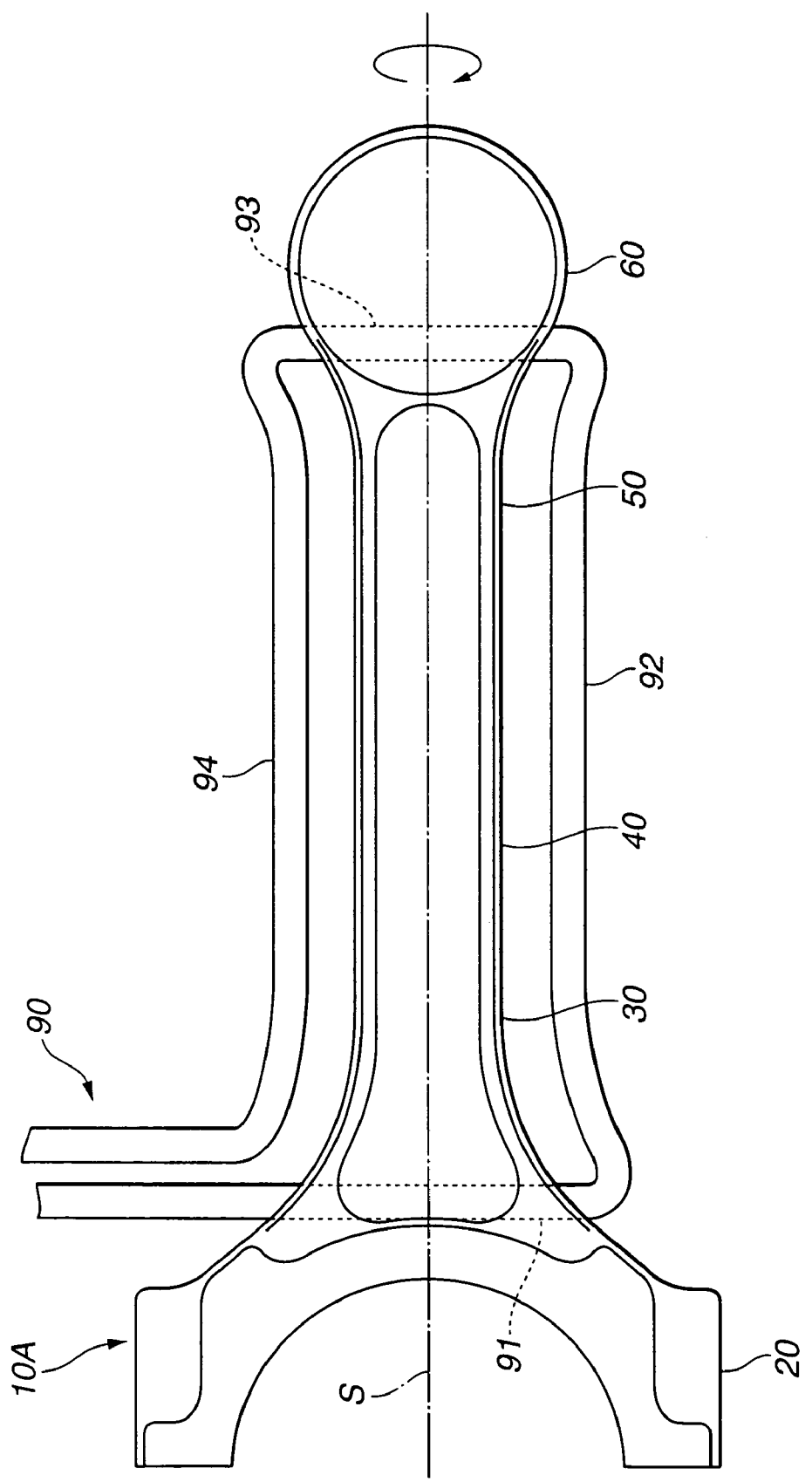
FIG. 11 is a plan view for explaining a high frequency hardening using an induction heating coil, applied in the step of "hardening" in FIG. 10.

Referring now to FIG. 11, description will be made of a hardening method in which high-frequency hardening is applied by using an induction heating coil 90.

Half-finished connecting rod 10A is positioned rotatably about its longitudinal axis S. Heating coil 90 is positioned in the vicinity of half-finished connecting rod 10A and in a location in which it will not hinder the rotation of half-finished connecting rod 10A.

Induction heating coil 90 has a substantially rectangular structure and has long-side portions 92 and 94 extending along joining sections 30 and 50 and connecting beam section 40 and short-side portions 91 and 93 extending across big and small ends 20 and 60, respectively.

Big and small ends 20 and 60 of half-finished connecting rod 10A are larger in shape than connecting beam section 40, and connecting beam section 40 (and joining sections 30 and 50) is situated between big and small ends 20 and 60.

Therefore, the clearances between long-side portions 92 and 94 of the induction heating coil and the half-finished connecting rod decrease slightly as they approach big and small ends 20 and 60, in view of the heat capacity of big and small ends 20 and 60 and the transfer of heat between big and small ends 20 and 60 and connecting beam section 40 (and joining sections 30 and 50).

Consequently, connecting beam section 40 acquires the hardening temperature required for thorough hardening and joining sections 30 and 50 have a distribution of hardening temperatures. In other words, induction heating coil 90 is positioned along joining sections 30 and 50 and the clearances between induction heating coil 90 and joining sections 30 and 50 are so set as to produce an adequate distribution of hardening temperatures.

Hardening is, for example, carried out by supplying a high frequency current (30 kHz) to For example, the output is 25 kW and the hardening temperature for connecting beam section 40 is 920° C.

As a result, a strength distribution conforming to a variation in cross sectional area is formed in joining sections 30 and 50. The rotating speed of half-finished connecting rod 10A is preferably not lower than, for example, 60 r.p.m. in order to prevent any non-uniform heating, since high-frequency hardening is done by a brief period of rapid heating.

During the step of shot blasting, oxide scales are removed from the surface of the half-finished connecting rod. During the step of coining, the thickness of the half-finished connecting rod is, for example, modified by a light degree of cold forging.

During the step of machining, machining is done for, for example, finishing the sliding portions of the big and small ends and forming oil ports in the big and small ends to thereby give a connecting rod as a finished part.

The big and small ends are low in hardness, good in machinability and easy of machining, since they are substantially not hardened. The joining sections of the connecting rod exhibit a satisfactory buckling strength owing to their strength distribution in which their strength increases with a reduction in cross sectional area.

According to the first embodiment of the present invention, it is, thus, possible to provide a process for manufacturing a high-strength connecting rod having good machinability and buckling strength.

Shot peening may be done between the steps of coining and machining to achieve an improved fatigue strength.

While the strength distribution of the joining sections is formed by producing a distribution of hardening temperatures, it can also be formed by, for example, producing a distribution of tempering time by controlling the cooling rate after heating to a single hardening temperature.

For high frequency hardening, it is possible to alter the conditions, such as the time duration of supply of a high frequency current and the output, and carry out heating with the induction heating coil several times discontinuously or continuously. In this case, it is possible to control the distribution of hardening temperatures with high accuracy in view of, for example, local heat transfer or dissipation, or heat capacity.

It is, moreover, possible to produce a distribution of hardening temperatures by installing a plurality of independently controlled induction heating coils along the joining sections and varying the duration for which a high frequency current is supplied.

It is also possible to produce a distribution of hardening temperatures by winding an induction heating coil about the half-finished connecting rod and varying the pitch of the coil along the joining sections.

Figure 12:
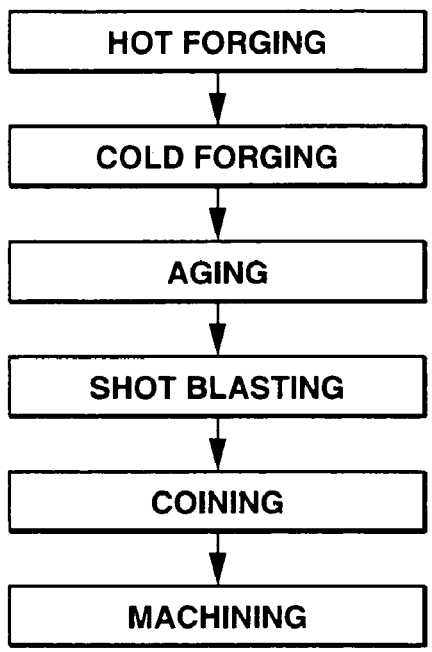
FIG. 12 is a flow diagram for explaining a producing method for a second embodiment of the connecting rod.

FIG. 12 is a flowchart for explaining a process for manufacturing a connecting rod according to a second embodiment of this invention. The second embodiment generally differs from the first embodiment in having the steps of cold forging and aging instead of the step of hardening.

Therefore, the process for manufacturing a connecting rod according to the second embodiment of the present invention has the steps of hot forging, cold forging, aging, shot blasting, coining and machining.

During the step of hot forging, a steel material is formed into substantially the shape of a connecting rod at a temperature not lower than its recrystallization temperature (for example, 800 to 1200° C.), whereby a roughly made connecting rod is obtained. The steel material may, for example, be carbon steel (for example, S40C to S50C according to JIS). The roughly made connecting rod is not limited to one formed from the steel material by hot forging.

During the step of cold forging, the roughly made connecting rod is formed into the shape of a connecting rod at a temperature not higher than its recrystallization temperature (for example, normal ambient temperature), whereby strain is introduced therein. According to the second embodiment of the present invention, an average of values taken across various sections is used for strain.

Figure 13:
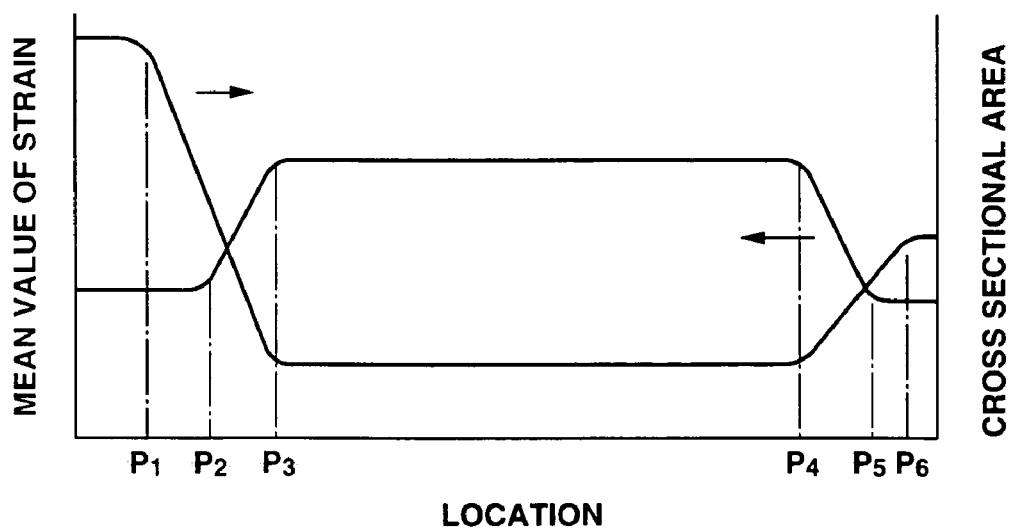
FIG. 13 is a graph showing the relationship between the cross sectional area and the mean value of strain introduced by "cold forging" shown in FIG. 12, in connection with the connecting rod of the second embodiment.

Strain is obtained by, for example, applying an FEM (finite element method) simulation, dividing the section of the roughly made connecting rod into a plurality of regions and finding an arithmetic mean of the values of strain as calculated from those regions. Thus, cold forging is done so that the mean value of strain may continuously vary with a variation in the cross sectional area of the joining sections, as shown in FIG. 13.

Figure 14:
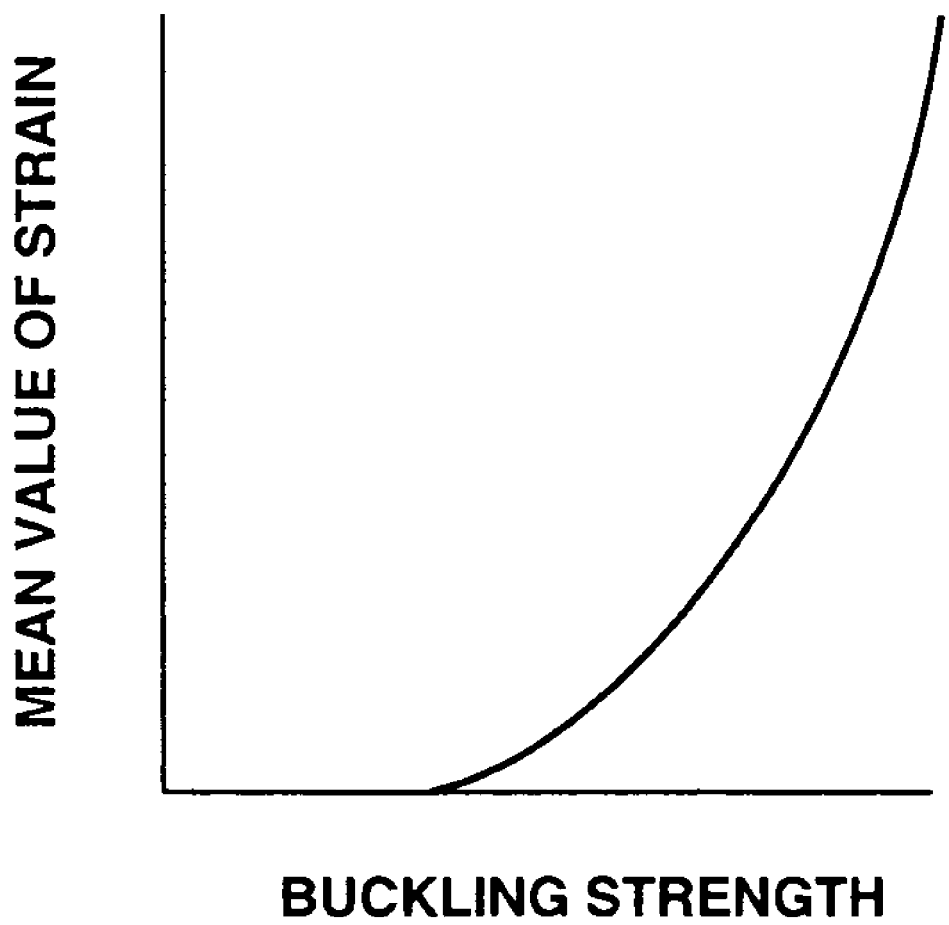
FIG. 14 is a graph showing the relationship between the mean value of strain and the buckling strength in connection with the connecting rod of the second embodiment.

The mean value of strain is in conformity with buckling strength, as shown in FIG. 14, and it is, therefore, possible to obtain a half-finished connecting rod having a strength distribution in which its strength increases with a reduction in cross sectional area as shown in FIG. 7 (the same strength distribution as according to the first embodiment of the present invention).

Accordingly, the joining sections have a strength distribution in which their strength increases with a reduction in cross sectional area, so that any portion having a small cross sectional area has a high buckling strength. On the other hand, the big and small ends are relatively low in strength and are, therefore, not low in machinability.

The shape of a connecting rod obtained by the step of hot forging according to the first embodiment of the present invention is now achieved by the steps of hot and cold forging. Therefore, the shape as obtained by the step of hot forging differs from the first embodiment to the second embodiment of the present invention.

The step of aging is carried out by, for example, holding at 400° C. for 30 minutes. And the half-finished connecting rod becomes a connecting rod as a finished part after the steps of shot blasting, coining and machining, as in the first embodiment of the present invention.

Description will now be made of a method of forming a distribution of strain by cold forging.

Figure 15:
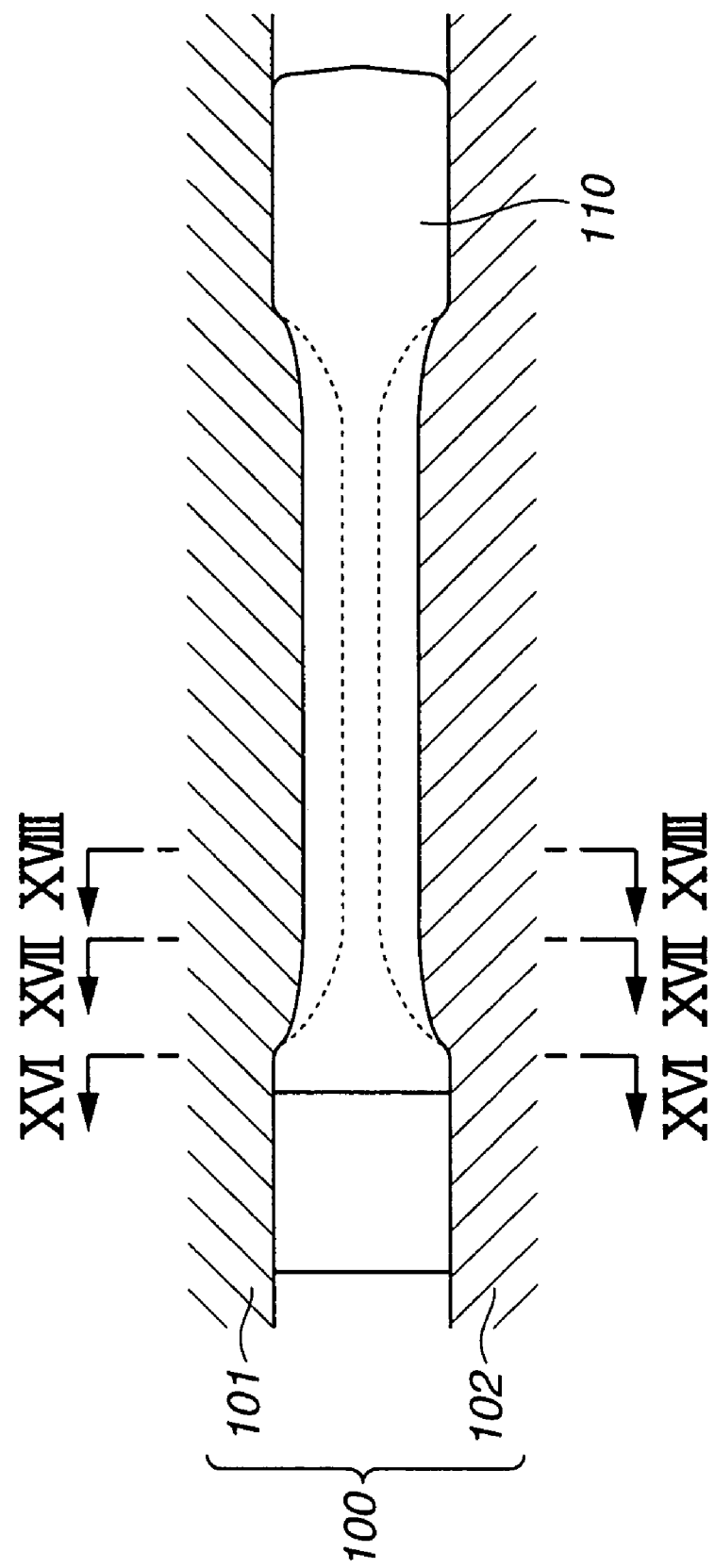
FIG. 15 is a sectional view for explaining a mold of a cold forging press in connection with the connecting rod of the second embodiment.
Figure 16:
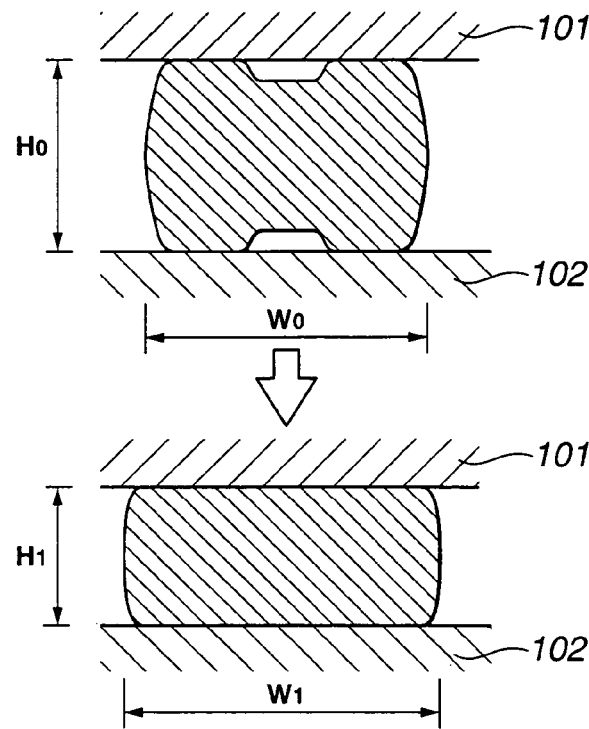
FIG. 16 is a sectional view taken along line XVI-XVI of FIG. 15, showing a change in form before and after the cold forging.
Figure 17:
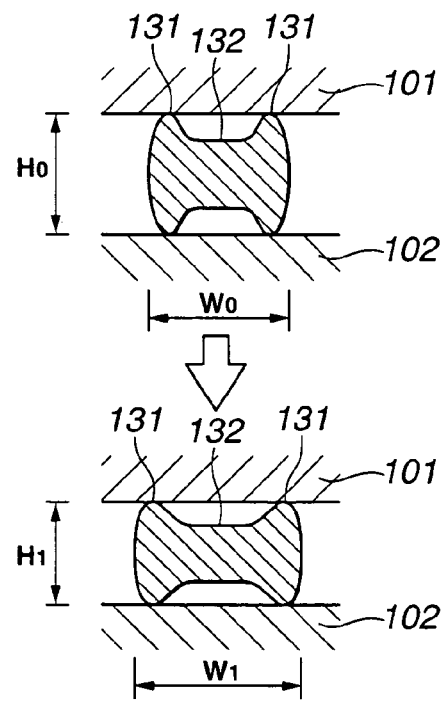
FIG. 17 is a sectional view taken along line XVII-XVII of FIG. 15, showing a change in form before and after the cold forging.
Figure 18:
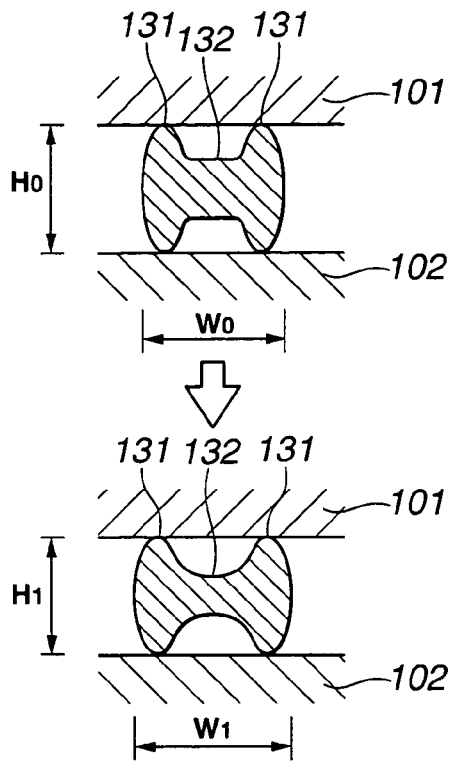
FIG. 18 is a sectional view taken along line XVIII-XVIII of FIG. 15, showing a change in form before and after the cold forging.

FIG. 15 is a sectional view for explaining a mold for a cold forging press, FIGS. 16 to 18 are views for explaining a difference as found in shape between before and after cold forging, FIG. 16 is a sectional view taken along line XVI-XVI of FIG. 15, FIG. 17 is a sectional view taken along line XVII-XVII of FIG. 15 and FIG. 18 is a sectional view taken along line XVIII-XVIII of FIG. 15.

The cold forging press for introducing strain has a mold 100 divided into an upper mold 101 and a lower mold 102.

Roughly made connecting rod 110 having substantially the shape of a connecting rod formed by hot forging is positioned between the upper and lower molds 101 and 102.

Roughly made connecting rod 110 is caused by cold forging to undergo plastic deformation and have its height H reduced (from $H_0$ to $H_1$) and its width W enlarged (from $W_0$ to $W_1$), whereby strain is introduced therein. The stroke of a slide in the cold forging press may, for example, be 148 mm and the number of strokes per minute may, for example, be 30.

The shape of roughly made connecting rod 110 is set based on its shape as obtained after cold forging and the strain introduced by cold forging. The shape of roughly made connecting rod 110 is preferably optimized for achieving the uniform introduction of strain and restraining the flow of the metal material and any flaw due to pulling-back of the metal material.

It is rib portions 131 that are squashed by upper and lower molds 101 and 102 for introducing strain. The selection of rib portions 131 alone is preferred for reducing the load of cold forging and making cold forging more efficient. It is, however, also possible to change the shapes of upper and lower molds 101 and 102 and set the load so that it may bear on joining portions 132 extending between rib portions 131 and forming recesses therebetween, too.

The shapes of upper and lower molds 101 and 102 are so set that the proportion of squashing of rib portions 131 may continuously vary with a variation in cross sectional area of the joining sections. The proportion of squashing corresponds to the proportion of reduction in height H of rib portions 131 between before and after cold forging ($=(H_0-H_1) \times 100/H_0$), and corresponds to strain.

Figure 19:
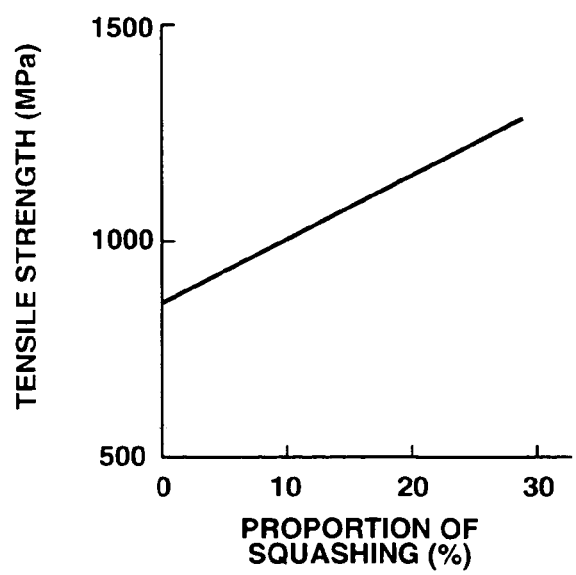
FIG. 19 is a graph showing the relationship between the tensile strength and the proportion of squashing in connection with the connecting rod of the second embodiment.
Figure 20:
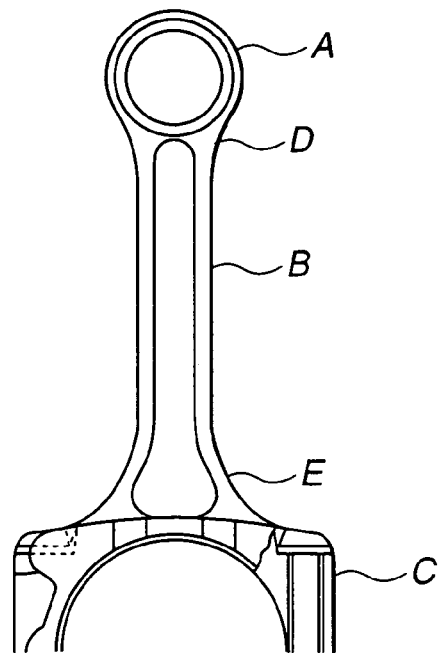
FIG. 20 is a schematic front view of a third embodiment of the connecting rod according to the present invention.
Figure 21:
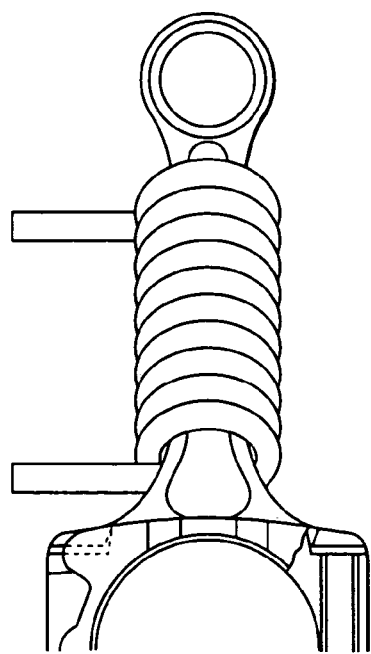
FIG. 21 is a schematic illustration showing the manner of hardening in a producing method for the connecting rod of FIG. 20.
Figure 22:
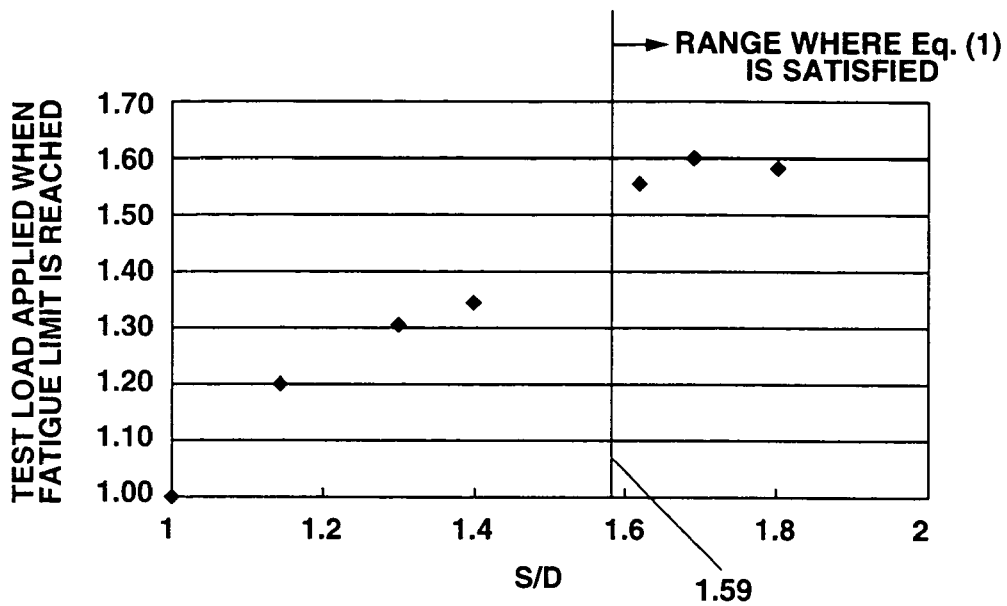
FIG. 22 is a graph showing the relationship between the fatigue strength and the S/D value in connection with the connecting rod of the third embodiment.

The proportion of squashing is proportional to tensile strength, as shown in FIG. 19, and a change in the proportion of squashing makes it possible to obtain a strength distribution in which strength increases with a reduction in cross sectional area.

Accordingly, the joining sections of a half-finished connecting rod obtained by cold forging roughly made connecting rod 110 by upper and lower molds 101 and 102 have a strength distribution in which their strength increases with a reduction in cross sectional area, and any portion having a small cross sectional area has a high buckling strength. On the other hand, the big and small ends are relatively low in strength and are, therefore, not low in machinability.

Thus, the second embodiment of the present invention also makes it possible to provide a high-strength connecting rod having good machinability and buckling strength and a process for manufacturing it.

The control of strain is not limited to its control based on the proportion of squashing of the rib portions, but can also be based on any parameter corresponding to strain, such as a reduction in cross sectional area of the joining sections.

It is also preferable to alter the cold forging conditions in accordance with a difference in thickness of the roughly made connecting rod to be cold forged, to thereby control the strain introduced by cold forging.

The variation in thickness of the roughly made connecting rod can be detected by, for example, laser measurement. The cold forging conditions include, for example, the setting of a shut height which is the distance between the slide and the bed.

Next, a third embodiment of the (high-strength) connecting rod according to the present invention will be discussed with reference to FIGS. 20 to 23. It is to be noted that "%" used in the description indicates "% by weight (%) on mass basis)" as far as no special note is shown.

An inventive concept of the first embodiment resides in a high-strength connecting rod comprising a connecting beam section serving as a main body of the connecting rod, the connecting beam section having a portion which is the smallest in cross sectional area throughout the connecting rod. A big end is located at a first end side of the connecting beam section. A small end is located at a second end side of the connecting beam section, the second end side being axially opposite to the first end side. A first joining section is located between the connecting beam section and the big end to connect the connecting beam section and the big end. A second joining section is located between the connecting beam section and the small end to connect the connecting beam section and the small end. In this connecting rod, each of the first and second joining sections gradually and continuously decreases in cross sectional area toward the connecting beam section. Additionally, a portion which is the lowest in fatigue strength exists in at least one of the big and small ends, and a portion which varies in fatigue strength exists in each of the first and second joining sections and in the connecting beam sections. Further, a product of the cross sectional area and the fatigue strength at a cross section of each of the joining and connecting beam sections is equal to or greater than a product of the cross sectional area and the fatigue strength in the smallest cross sectional area portion in the connecting beam section. The "cross section" means a cross section perpendicular to the axis of the connecting rod, so that the "cross sectional area" means a cross sectional area at the cross section perpendicular to the axis of the connecting rod.

Another inventive concept for the first embodiment resides in a high-strength connecting rod comprising a connecting beam section serving as a main body of the connecting rod, the connecting beam section having a portion which is the smallest in cross sectional area throughout the connecting rod. A big end is located at a first end side of the connecting beam section. A small end is located at a second end side of the connecting beam section, the second end side being axially opposite to the first end side. A first joining section is located between the connecting beam section and the big end to connect the connecting beam section and the big end. A second joining section is located between the connecting beam section and the small end to connect the connecting beam section and the small end. In this connecting rod, each of the first and second joining sections gradually and continuously decreases in cross sectional area toward the connecting beam section. Additionally, a cross section of each of the connecting beam section and each of the first and second joining sections includes at least one of martensitic structure and ferritic-pearlitic structure and satisfies the following expression:

$$S/D \geq 1/\{(1-\beta)Ms/100+\beta\} \qquad \text{Eq.(1)}$$

where S is a cross sectional area of any portion of each of the connecting beam section and each of the first and second joining sections; D is a cross sectional area of the smallest cross sectional area portion of the connecting beam section; $\beta$ is a fatigue strength of an unhardened structure/a fatigue structure of a tempered martensitic structure; Ms is a proportion of area of the tempered martensitic structure in the portion whose sectional area is S. Further, a whole cross section of the smallest cross sectional area portion is formed of the tempered martensitic structure.

The high-strength connecting rod of this invention is a connecting rod so shaped as to have a connecting beam section, a big end, a small end and a joining section as stated above. The connecting rod has a portion of the smallest cross sectional area in its connecting beam section, a portion of the lowest fatigue strength at its big or small end, and a portion of varying fatigue strength in its joining and connecting beam sections. In another embodiment, a portion which is the lowest in fatigue strength exists in at least one of the big and small ends, and a portion which varies in fatigue strength exists in each of the first and second joining sections and in the connecting beam sections. The connecting rod is so made that the product of its cross sectional area and fatigue strength at cross section of its joining and connecting beam sections may be equal to or greater than the product of its cross sectional area and fatigue strength in its portion of the smallest cross sectional area in its connecting beam section. The connecting rod contains 0.73% or less of C on a mass basis (i.e., % by weight) and is so made that the cross section of each of its connecting beam and joining sections may be composed of a tempered martensitic structure or a ferritic-pearlitic structure, or a mixture of these structures satisfying relational expression or Eq.(1) given above. At least the entire cross section of its portion of the smallest cross sectional area in its connecting beam section may be of a tempered martensitic structure. Therefore, it is possible to achieve a reduction of residual stress in its fully hardened portion and its boundary of hardening, an improvement in the fatigue strength of the connecting rod and a reduction in the weight of the part.

In the context of this invention, fatigue strength means fatigue limit. The portion of varying fatigue strength existing in the joining and connecting beam sections preferably has a continuously varying fatigue strength not having any sharp drop.

As regards the chemical composition of the high-strength connecting rod of this invention, or the composition of its steel material, it is possible to use steel having a C content of 0.73% or less (not including 0), and it is preferable to use alloy steel containing 0.20 to 0.43% of C, 0.05 to 2.0% of Si, 0.30 to 1.40% of Mn, less than 0.07% (not including 0) of P, 2.5% or less (not including 0) of Cr, 0.05% or less (not including 0) of Al and 0.005 to 0.03% of N and further containing 0.03 to 0.5% of V, 0.005 to 0.5% of Nb or 0.005 to 0.5% of Ti or any combination of those elements (V, Nb, Ti), the balance being Fe and impurities, so that any unhardened portion thereof may be improved in fatigue strength.

It is also possible to use alloy steel containing 0.20 to 0.43% of C, 0.05 to 2.0% of Si, 0.30 to 1.40% of Mn, 0.07 to 0.15% of P, 2.5% or less (not including 0) of Cr, 0.05% or less (not including 0) of Al and 0.005 to 0.03% of N and further containing 0.03 to 0.5% of V, 0.005 to 0.5% of Nb or 0.005 to 0.5% of Ti or any combination of those elements (V, Nb, Ti), the balance being Fe and impurities, and the use of such an alloy steel, or an alloy steel having a high P content makes it possible to achieve not only a similar improvement in the fatigue strength of any unhardened portion, but also a good progress of fracture not causing substantially any plastic deformation of the fractured surfaces during the separation (or crushing) of the big end by any fracture begun with a cut made by working, but allowing a highly intimate contact between the fractured surfaces, thereby making it possible to produce a connecting rod at a lower cost than by mechanical cutting.

It is also possible to add 2.0% or less of Ni, 1.0% or less of Mo or 0.0010 to 0.0030% of B, or any combination of such elements (Ni, Mo, B) to the alloy and thereby improve its harden-ability.

It is further possible to add 0.2% or less of S, 0.3% or less of Pb, 0.1% or less of Ca or 0.3% or less of Bi, or any combination of such elements (Pb, Ca, Bi) and thereby improve the machinability of the material and facilitate its machining.

The high-strength connecting rod of this invention as described above may be made by forming either steel material into the shape of a connecting rod as described above, hardening it by using an induction current and tempering it at a temperature of 200 to 650° C., in which a tempering temperature in the range of 350 to 550° C. is more preferable for a further improved fatigue strength.

For hardening by an induction current, it is preferable to use a current with a frequency of 5 to 200 kHz, or more preferably 7 to 50 kHz. While the usual high-frequency hardening aimed at surface hardening is carried out at a high frequency in the order of 200 kHz, it is desirable according to this invention to apply a relatively low, or as it were medium frequency as mentioned above to harden even the inside of the connecting beam section to make the connecting rod more resistant to the pressure of combustion which it receives from the piston. The same range of frequency can basically be employed for tempering by an induction current to temper the whole connecting rod uniformly.

While tempering treatment in an electric furnace can, for example, be employed for the manufacturing process of this invention, it is also possible to employ heating by an induction current for tempering treatment as in the case of hardening to shorten the time for the treatment.

Explanation will now be made briefly of the reasons for the limitation of the steel composition in the high-strength connecting rod of this invention.

C: 0.73% or less

Carbon is an element necessary for ensuring the strength (hardness) of steel and is added at 0.73% at maximum, preferably in the range of 0.20 to 0.43%, since too little makes any unhardened portion deficient in fatigue strength and hardenability, while too much is likely to bring about a less easy cutting property.

Si: 0.05 to 2.0%

Silicon is an element which is effective for an improved fatigue strength and is preferably added in the range of 0.05 to 2.0%, since less than 0.05% is insufficient for obtaining any such effect, while the addition of over 2.0% is likely to bring about a less easy cutting property.

Mn: 0.30 to 1.40%

Manganese is an element which is added as a deoxidizing agent for steel making, and is effective for improving hardenability and for improving fatigue strength like Si, and it is preferably added in the range of 0.30 to 1.40%, since less than 0.30% is not sufficient for producing any such effect markedly, while over 1.40% is likely to bring about a less easy cutting property.

P: Less than 0.07%, or 0.07 to 0.15%

Phosphorus is an element considered usually as impurity, but the presence of a small amount thereof in steel serves to improve its fatigue strength. The presence of a relatively large amount thereof serves to decrease the plastic deformation of the connecting rod at its big end during its crushing fracture and facilitate its separation, though it may lower hot workability.

When an improved fatigue strength is aimed at without the sacrifice of hot workability, therefore, it is desirable to secure a content of less than 0.07% and in order to facilitate the fracture and separation of the big end, it is desirable to add in the range of 0.07 to 0.15%. A phosphorus content exceeding 0.15% not only brings about a lower hot workability, but also is likely to cause hardening cracking.

Cr: 2.5% or less

Chromium is an element effective for improving hardenability and fatigue strength, but is preferably added at 2.5% at maximum, since a larger amount is likely to lower workability, as well as hardening stability.

Al: 0.05% or less

Aluminum is an element added as a deoxidizing agent for steel making and serves to restrain cracking during hardening (hardening cracking), but is preferably added with an upper limit of 0.05%, since the addition of a larger amount is likely to increase non-metallic inclusions and lower tenacity.

N: 0.005 to 0.03%

Nitrogen is an element producing AlN to form finely divided austenite crystal grains and serving to improve fatigue strength, but is preferably added in the range of 0.005 to 0.03%, since the addition of a larger amount is likely to lower workability.

V: 0.03 to 0.5%
Nb: 0.005 to 0.5%
Ti: 0.005 to 0.5%

These elements are added alone or in a combination of two or more for improving fatigue strength and the ranges shown above are desirable, since it is difficult to obtain any improved result in fatigue strength if V is less than 0.3%, or if Nb or Ti is less than 0.005%, while the addition of any of them over 0.5% is likely to result in a less easy cutting property.

Ni: 2.0% or less
Mo: 1.0% or less
B: 0.0010 to 0.0030%

They are elements effective for improving hardenability, and the addition of any of them alone or in a combination of two or more improves hardenability and fatigue strength, though no marked result can be obtained by B alone unless 0.0010% or more is added. On the other hand, the addition of Ni and Mo over 2.0% and 1.0%, respectively, is likely to result in a lower workability. The addition of B over 0.0030% is also likely to result in a lower workability as grain-boundary oxidation occurs during hot forging.

S: 0.2% or less
Pb: 0.3% or less
Ca: 0.1% or less
Bi: 0.3% or less

These elements are all effective for improving easy cutting property and the addition of any of them alone or in a combination of two or more improves the machinability of the material and makes its machining easy. The ranges shown above are desirable, since it is likely that an S content over 0.2% may result in a lower fatigue strength, a Pb or Bi content over 0.3% may result in a worse workability and a Ca content over 0.1% may result in a lower tenacity.

As regards any component for which only the upper limit has been mentioned, it is to be understood that no case of 0% is supposed to exist for any such component, insofar as it is positively added.

EXAMPLES

The invention will now be described more specifically by way of examples.

Example 1

Steels A and D were employed from the four kinds of steel shown in Table 1, and were hot forged into the same shape of a connecting rod having a small end A, a connecting beam section B, a big end C and joining sections D and E as shown in FIG. 1, and an electric current having a high frequency of 30 kHz was applied to a coil disposed about the connecting beam section B of each rod as shown in FIG. 2 to heat it to 920° C. by an induction current, and after 10 seconds of holding, it was quenched in water.

All of the four kinds of steel shown in Table 1 have their machinability improved by the addition of S. The hardenability shown in the table was determined by a Method of Testing the Hardenability of Steel (Jominy one end hardening method) as specified by JIS (Japanese Industrial Standard) G 0561, and the values of JHRC45 as measured are shown by relative values obtained when the value of steel A is taken as 1.

TABLE 1

| steel | Chemical composition (%) | | | | | | | | Hardenability |
|---|---|---|---|---|---|---|---|---|---|
| | C | Si | Mn | P | S | Cr | B | V | |
| A | 0.40 | 0.25 | 0.73 | 0.014 | 0.021 | 0.16 | — | 0.1 | 1 |
| B | 0.40 | 0.60 | 0.79 | 0.098 | 0.049 | 0.17 | — | 0.1 | 1.6 |
| C | 0.32 | 0.80 | 1.00 | 0.014 | 0.051 | 0.20 | 0.0020 | 0.2 | 2.9 |
| D | 0.40 | 0.24 | 0.75 | 0.016 | 0.030 | 0.20 | — | — | 0.9 |

Then, after 30 minutes of tempering at 460° C. in an electric furnace, shot peening was done with steel shots to an arc height of 0.2 mmA and a coverage of 300%.

Structures were observed of two portions, portion P of the smallest cross sectional area in connecting beam section B and portion Q having a cross sectional area 1.5 times larger than that of portion P of the smallest cross sectional area and located closer to big end C than portion P was. A plurality of connecting rods were so made that any other portion of each rod might be of the same structure and hardness with its portions P and Q. A tensile and compressive fatigue test was conducted on each rod with its small and big ends A and C chucked for measuring its fatigue strength (fatigue limit) and examine its relation to the fatigue strength of portions P and Q. The results are shown in Table 2.

In Table 2, the fatigue strengths (fatigue limits) of two connecting rods Nos. 1 and 2 are shown by relative values with the value of connecting rod No. 1 taken as 1. The evaluation of partial fatigue strengths, or the fatigue strengths of portions P and Q, was made by using the values obtained when a similar tensile and compressive fatigue test was conducted on the connecting rod having in its entirety the same structure and hardness with its portions P and Q. The fatigue strengths of portions P and Q are shown by relative values with the value of portion P taken as 1.

TABLE 2

| | | No. | |
|---|---|---|---|
| | | 1 | 2 |
| | Material steel | A | D |
| Hardening | Heating time (sec) | 5 | |
| | Hardening temp. (° C.) | 920 | |
| | Holding time (sec) | 10 | |
| Tempering | Device | Electric furnace | |
| | Tempering temp. (° C.) | 460 | |
| | Holding time (sec) | 1800 | |
| Portion of smallest cross sectional area (portion P) | Cross sectional area | 1 | 1 |
| | Structure*1) | Ms | Ms |
| | Fatigue strength | 1 | 1 |
| | Cross sectional area × Fatigue strength | 1 | 1 |

TABLE 2-continued

|  |  | No. | |
|---|---|---|---|
|  |  | 1 | 2 |
| Portion Q | Cross sectional area | 1.5 | 1.5 |
|  | Structure*1) | F-P | F-P |
|  | Fatigue strength | 0.71 | 0.62 |
|  | Cross sectional area × Fatigue strength | 1.065 | 0.93 |
| Fatigue test | Fatigue strength (fatigue limit) | 1 | 0.93 |
|  | Position of fatigue failure | Portion P | Portion Q |

*1)Ms: Tempered martensitic structure; F-P: Ferrtic-pearlitic structure.

As a result, it was confirmed that connecting rod No. 1 having in its portion Q the product of cross sectional area and fatigue strength which was greater than the product of cross sectional area and fatigue strength in its portion P of the smallest cross sectional area was higher in fatigue strength than connecting rod No. 2 having in its portion Q the product of cross sectional area and fatigue strength which was smaller than the product of cross sectional area and fatigue strength in its portion P of the smallest cross sectional area.

Example 2

Steel A was employed from the four kinds of steel shown in Table 1, and was hot forged into a similar shape of a connecting rod having a small end A, a connecting beam section B, a big end C and joining sections D and E as shown in FIG. 1, and an electric current having a high frequency of 30 kHz was applied to a coil disposed about the connecting beam section B of each rod as shown in FIG. 2 to heat it to 920° C. by an induction current, and after a specific holding time, it was quenched in water. The heating and holding time was adjusted by varying the duration of current supply.

Then, a similar shot peening treatment was made after 30 minutes of similar tempering treatment at 460° C. in an electric furnace, in a similar manner to that of Example 1.

Further measurement was made of the cross sectional area D of the portion P of the smallest cross sectional area in connecting beam section B, and determination was made of the smallest cross sectional area $S_o$ reducing tempered martensite to 0% (i.e. leaving only a ferritic-pearlitic structure) in connecting beam section B and joining sections D and E.

Then, a tensile and compressive fatigue strength test was conducted on a plurality of connecting rods made under the same conditions as those in Example 1 to determine their fatigue strength (fatigue limit).

The fatigue strength Fq of the hardened portion and the fatigue strength Fn of the non-hardened portion were determined for the calculation of value of $\beta(=Fn/Fq)$, and $1/\beta$ was calculated as the value of $1/\{(1-\beta)Ms/100+\beta\}$ in the portion of the smallest cross sectional area $(S_o)$ having 0% of tempered martensite (Ms=0). The results are shown in Table 3 and FIG. 3.

In Table 3, the fatigue strength of the hardened portion is shown by the value of fatigue strength as determined when connecting beam section B had a portion composed of a tempered martensitic structure across its whole cross section and fatigue failure occurred to that tempered martensitic portion, and the fatigue strength of the non-hardened portion is shown by the value of fatigue strength of the connecting rod which was not hardened. The values of fatigue strength are the relative values based on the value of the non-hardened portion taken as 1, and the smallest cross sectional area $S_o$ reducing tempered martensite to 0% is shown by a relative value based on the smallest cross sectional area D of connecting beam section B taken as 1. In Table 3, "I-sec portion (or . . . portion)" indicates a portion (or . . . portion) having an I-shaped cross section.

TABLE 3

|  |  | No. | | | | | | |
|---|---|---|---|---|---|---|---|---|
|  |  | 3 | 4 | 5 | 6 | 7 | 8 | 9 |
|  | Material steel |  |  |  | A |  |  |  |
| Hardening | Heating time (sec) | — |  |  | 5 |  |  |  |
|  | Hardening temp. (° C.) | — |  |  | 920 |  |  |  |
|  | Holding time (sec) | — | 10 | 30 | 50 | 80 | 99 | 100 |
| Tempering | Device | — |  |  | Electric furnace |  |  |  |
|  | Tempering temp. (° C.) | — |  |  | 460 |  |  |  |
|  | Holding time (sec) | — |  |  | 1800 |  |  |  |
| Portion of smallest cross sectional area | Structure*1) | F-P | Ms | Ms | Ms | Ms | Ms | Ms |
|  | Cross sectional area D |  |  |  | 1 |  |  |  |
|  | Hardness (HRC) | 24 | 42 | 42 | 42 | 42 | 42 | 42 |
| Partial fatigue strength | Hardened portion: Fq | — | 1.59 | 1.59 | 1.59 | 1.59 | 1.59 | 1.59 |
|  | Non-hardened portion: Fn |  |  |  | 1 |  |  |  |
|  | $\beta$ (=Fn/Fq) | — | 0.63 | 0.63 | 0.63 | 0.63 | 0.63 | 0.63 |
| Smallest cross sectional area reducing Ms to 0%: $S_o$ |  | 1 | 1.15 | 1.30 | 1.40 | 1.62 | 1.69 | 1.80 |
|  | $S_o/D$ | 1 | 1.15 | 1.30 | 1.40 | 1.62 | 1.69 | 1.80 |
| $1/\{(1-\beta)Ms/100+\beta\}$ |  | — | 1.59 | 1.59 | 1.59 | 1.59 | 1.59 | 1.59 |
| Fatigue test | Fatigue strength (fatigue limit) | 1 | 1.20 | 1.31 | 1.35 | 1.56 | 1.60 | 1.58 |
|  | Position of fatigue failure | I-sec portion | Boundary of hardening close to small end | Boundary of hardening close to small end | Boundary of hardening close to small end | I-sec completely hardened portion | I-sec completely hardened portion | I-sec completely hardened portion |

TABLE 3-continued

|  | No. | | | | | | |
|---|---|---|---|---|---|---|---|
|  | 3 | 4 | 5 | 6 | 7 | 8 | 9 |
| Remarks | Not hard-ened | | | | | | |

*1)F-P: Ferritic-pearlitic structure;
Ms: Tempered martensitic structure.

As a result, it was confirmed that if $S_O/D$ was equal to, or greater than 1.59 as a value of $1/\{(1-\beta)Ms/100+\beta\}$, or satisfied expression or Eq. (1), the connecting rod had a drastically improved fatigue strength, since the boundary of hardening having low fatigue strength had a sufficiently large cross sectional area to avoid any fatigue failure occurring therefrom.

Example 3

Steels A, B and C shown in Table 1 were employed for making connecting rods by hot forging like Examples 1 and 2 above, and an electric current having a high frequency of 30 kHz was likewise applied to a coil disposed about the connecting beam section B of each rod to heat it to 920° C. by an induction current, and after 99 seconds of holding, it was quenched in water. After tempering treatment under various conditions using an electric furnace and an induction current, a shot peening treatment similar to that in Example 1 was made and the test similar to that in Example 1 was conducted. The results are shown in Table 4 and FIG. 4. An electric current having a high frequency of 30 kHz was employed for tempering treatment using an induction current as in the case of the hardening treatment.

In Table 4, too, the values of fatigue strength are the relative values based on the value of the non-hardened portion taken as 1, and the smallest cross sectional area $S_O$ reducing tempered martensite to 0% is shown by a relative value based on the smallest cross sectional area D of connecting beam section B taken as 1.

TABLE 4

| | | No. | | | | | | | | |
|---|---|---|---|---|---|---|---|---|---|---|
| | | 10 | 11 | 12 | 13 | 14 | 15 | 16 | 17 | 18 |
| Hardening | Material steel | A | | | | B | | C | | |
| | Heating time (sec) | | | | | 5 | | | | |
| | Hardening temp. (° C.) | | | | | 920 | | | | |
| | Holding time (sec) | | | | | 99 | | | | |
| Tempering | Device | — | Electric furnace | Electric furnace | Electric furnace | Electric furnace | Electric furnace | Induction current | Induction current | Induction current |
| | Tempering temp. (° C.) | — | 800 | 200 | 400 | 460 | 650 | 460 | 460 | 460 |
| | Holding time (sec) | — | 1800 | 1800 | 1800 | 1800 | 1800 | 15 | 15 | 15 |
| Portion of smallest cross sectional area | Structure*1) | M | F-P | Ms | Ms | Ms | Ms | Ms | Ms | Ms |
| | Cross sectional area D | | | | | 1 | | | | |
| | Hardness (HRC) | 57 | 17 | 55 | 44 | 42 | 32 | 46 | 47 | 44 |
| Partial fatigue strength | Hardened portion: Fq | 1.11 | 0.61 | 1.34 | 1.63 | 1.59 | 1.34 | 1.64 | 1.62 | 1.41 |
| | Non-hardened portion: Fn | | | | | 1 | | | | |
| | $\beta$ (=Fn/Fq) | 0.90 | 1.64 | 0.75 | 0.61 | 0.63 | 0.75 | 0.61 | 0.62 | 0.71 |
| Smallest cross sectional area reducing Ms to 0%: $S_o$ | | — | — | 1.69 | 1.69 | 1.69 | 1.69 | 1.69 | 1.69 | 1.72 |
| $S_o/D$ | | — | — | 1.69 | 1.69 | 1.69 | 1.69 | 1.69 | 1.69 | 1.72 |
| $1/\{(1-\beta)Ms/100+\beta\}$ | | 1.11 | 0.61 | 1.34 | 1.63 | 1.59 | 1.34 | 1.64 | 1.62 | 1.41 |
| Fatigue test | Fatigue strength (fatigue limit) | 1.10 | 0.59 | 1.37 | 1.62 | 1.60 | 1.38 | 1.56 | 1.63 | 1.45 |
| | Position of fatigue failure | I-sec completely hardened portion | I-sec completely hardened portion | I-sec completely hardened portion | I-sec completely hardened portion | I-sec completely hardened portion | I-sec completely hardened portion | I-sec completely hardened portion | I-sec completely hardened portion | I-sec completely hardened portion |
| | Remarks | Not hardened | | | | | | | | |

*1)F-P: Ferritic-pearlitic structure;
Ms: Tempered martensitic structure;
M: Martensitic structure.

As a result, it was found that with an elevation of tempering temperature from room temperature to a range of 200 to 460° C., the connecting rod had its fatigue strength raised owing to the disappearance of any internal strain after hardening, and it was confirmed that a further elevation of the tempering temperature caused fatigue strength to start dropping, and that its excess of the A1 transformation point (about 726° C.) resulted in a sharp drop in fatigue strength, as the austenitization of the structure made it impossible to obtain a hardened and tempered structure (tempered marten-site).

Figure 23:
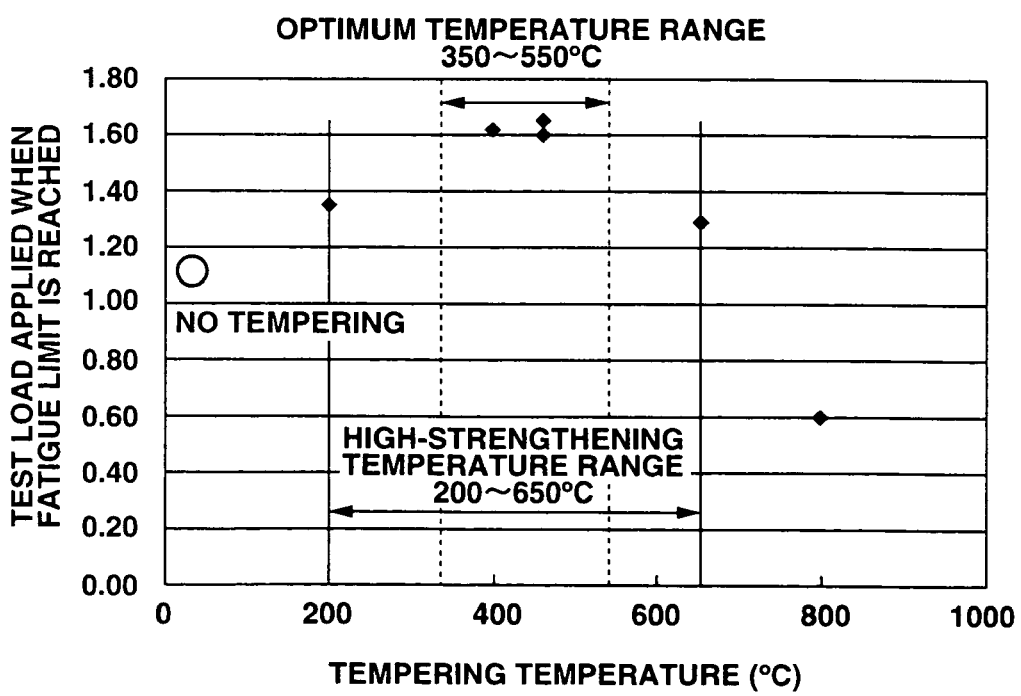
FIG. 23 is a graph showing the relationship between the fatigue strength and the tempering temperature in connection with the connecting rod of the third embodiment.

As is obvious from FIG. 23, therefore, the high fatigue strength of a connecting rod is obtained by a tempering temperature in the range of 200 to 650° C. and tempering in a temperature range of 350 to 550° C. is preferable for achieving an improved effect in the fatigue strength of a connecting rod.

It was also confirmed that a connecting rod tempered to a uniform temperature by using an induction current was comparable in fatigue strength to what was obtained by using an electric current, and that tempering by an induction current enabled treatment in a shorter time.

It was also found that a similar level of fatigue strength could be obtained by using an alloy steel containing a large amount of phosphorus (P) for easy separation by crushing fracture (steel B shown in Table 1) and an alloy steel containing boron (B) for improved hardenability (steel C shown in Table 1).

The results of the examples described above are merely illustrative and the optimum hardening conditions, etc. may vary with materials and heating facilities.

More specifically, it is necessary to set a low frequency for hardening to avoid surface overheating in the event that a large depth of hardening is desired. When any steel of low hardenability is used, it is necessary to raise the cooling rate of quenching.

Advantages of the third embodiment of the connecting rod will be discussed.

The high-strength connecting rod of this invention exhibits very excellent advantages such as a reduced residual stress in its completely hardened portion and boundary of hardening and an improved fatigue strength, as well as a reduction in weight, owing to its structure described above, particularly its structure as a connecting rod having a connecting beam section, big and small ends and joining sections therebetween, and having a portion of the smallest cross sectional area in its connecting beam section, in which the product of its cross sectional area and fatigue strength across any cross section of its joining and connecting beam sections being equal to or greater than the product of its cross sectional area and fatigue strength in its portion of the smallest cross sectional area. The connecting rod contains 0.73% or less of C and so made that the cross section of each of its connecting beam and joining sections may be composed of a tempered martensitic structure or ferritic-pearlitic structure, or a mixture of the above structures satisfying the relational expression or Eq.(1) given above. At least the entire cross section of its portion of the smallest cross sectional area may be of a tempered martensitic structure.

The manufacturing process of this invention makes it easy to obtain a connecting rod having the structure described above, owing to tempering in a temperature range of 200 to 650° C., preferably 350 to 550° C., preferably using an induction current after hardening by using an induction current when manufacturing the high-strength connecting rod as described above.

This application is based on a prior Japanese Patent Application No. P2003-041360 filed Feb. 19, 2003, a prior Japanese Patent Application No. P2003-082505 filed on Mar. 25, 2003, and a prior Japanese Patent Application No. P2003-146734 filed on May 23, 2003. The entire contents of these Japanese Patent Applications Nos. P2003-041360, P2003-082505 and P2003-146734 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A connecting rod comprising:
a connecting beam section serving as a main body of the connecting rod;
a big end located at a first end side of the connecting beam section;
a small end located at a second end side of the connecting beam section, the second end side being axially opposite to the first end side;
a first joining section located between the connecting beam section and the big end to connect the connecting beam section and the big end; and
a second joining section located between the connecting beam section and the small end to connect the connecting beam section and the small end;
wherein each of the first and second joining sections gradually and continuously decreases in cross sectional area toward the connecting beam section and has a strength distribution in which a strength increases with a decrease in the cross sectional area.

2. A connecting rod as claimed in claim 1, wherein the strength distribution is based on a proportion (%) of martensite.

3. A connecting rod as claimed in claim 2, wherein the proportion of martensite (%) changes based on a change of the cross sectional area of each of the first and second joining sections in a manner to satisfy a relationship represented by the following formula:

$$D/D_{min} \geq 1/((1-\alpha) \times Ms/100 + \alpha)$$

where $D_{min}$ is the minimum value of the cross sectional area of each of the first and second joining sections; and $\alpha$ is a value obtained by dividing a buckling stress without hardening by a buckling stress with hardening.

4. A connecting rod as claimed in claim 2, wherein the strength distribution is formed based on a distribution in at least one of a hardening temperature and a tempering time for each of the first and second joining sections.

5. A connecting rod as claimed in claim 1, wherein the strength distribution is formed based on a strain introduced into each of the first and second joining sections by a cold forging.

6. A connecting rod as claimed in claim 5, wherein the strain gradually and continuously changes with a change in the cross sectional area of each of the first and second joining sections.

7. A connecting rod as claimed in claim 5, wherein the strain is adjusted in accordance with a dispersion in thickness of a roughly made connecting rod as a material of the connecting rod.

8. A connecting rod as claimed in claim 5, wherein each of the first and second joining sections is subjected to an aging after the cold forging.

9. A method of producing a connecting rod including
a connecting beam section serving as a main body of the connecting rod;
a big end located at a first end side of the connecting beam section;
a small end located at a second end side of the connecting beam section, the second end side being axially opposite to the first end side;
a first joining section located between the connecting beam section and the big end to connect the connecting beam section and the big end; and
a second joining section located between the connecting beam section and the small end to connect the connecting beam section and the small end,
the producing method comprising:
gradually and continuously decreasing each of the first and second joining sections in cross sectional area toward the connecting beam section; and
providing to each of the first and second joining sections a strength distribution in which a strength increases with a decrease in the cross sectional area.

10. A producing method as claimed in claim 9, wherein the strength distribution is based on a proportion (%) of martensite.

11. A producing method as claimed in claim 10, wherein the proportion of martensite (%) changes based on a change of the cross sectional area of each of the first and second joining sections in a manner to satisfy a relationship represented by the following formula:

$$D/D_{min} \geq 1/((1-\alpha) \times Ms/100 + \alpha)$$

where $D_{min}$ is the minimum value of the cross sectional area of each of the first and second joining sections; and $\alpha$ is a value obtained by dividing a buckling stress without hardening by a buckling stress with hardening.

12. A producing method as claimed in claim 10, wherein the strength distribution is formed based on a distribution in at least one of a temperature of a hardening and a time of a tempering for each of the first and second joining sections.

13. A producing method as claimed in claim 12, wherein the hardening is a high-frequency hardening using an induction heating coil, the hardening being carried out by disposing the induction heating coil along each of the first and second joining sections and by setting a distance between the induction heating coil and each of the first and second joining sections in a manner to form the distribution in the hardening temperature.

14. A producing method as claimed in claim 9, wherein the strength distribution is formed based on a strain introduced into each of the first and second joining sections by a cold forging.

15. A method as claimed in claim 14, wherein the strain gradually and continuously changes with a change in the cross sectional area of each of the first and second joining sections.

16. A producing method as claimed in claim 14, wherein the strain is based on squashing a rib portion of each of the first and second joining sections.

17. A producing method as claimed in claim 14, wherein the strain is adjusted in accordance with a dispersion in thickness of a roughly made connecting rod as a material of the connecting rod.

18. A producing method as claimed in claim 14, wherein each of the first and second joining sections is subjected to an aging after the cold forging.

19. A high-strength connecting rod comprising:
a connecting beam section serving as a main body of the connecting rod, the connecting beam section having a smallest cross sectional area portion which is the smallest in cross sectional area throughout the connecting rod;
a big end located at a first end side of the connecting beam section;
a small end located at a second end side of the connecting beam section, the second end side being axially opposite to the first end side;
a first joining section located between the connecting beam section and the big end to connect the connecting beam section and the big end; and
a second joining section located between the connecting beam section and the small end to connect the connecting beam section and the small end;
wherein each of the first and second joining sections gradually and continuously decreases in cross sectional area toward the connecting beam section;
wherein a lowest fatigue strength portion which is the lowest in fatigue strength exists in at least one of the big and small ends, and a variable fatigue strength portion which varies in fatigue strength exists in each of the first and second joining sections and in the connecting beam section;
wherein a product of the cross sectional area and the fatigue strength at a cross section of each of the joining and connecting beam section is equal to or greater than a product of the cross sectional area and the fatigue strength in the smallest cross sectional area portion in the connecting beam section.

20. A high-strength connecting rod as claimed in claim 19, wherein the high strength connecting rod is formed of a steel including, on mass basis, 0.20 to 0.43% of C, 0.05 to 2.0% of Si, 0.30 to 1.40% of Mn, less than 0.07% of P, 2.5% or less of Cr, 0.05% or less of Al and 0.005 to 0.03% of N, and at least one selected from the group consisting of 0.03 to 0.5% of V, 0.005 to 0.5% of Nb and 0.005 to 0.5% of Ti, the balance being Fe and impurities.

21. A high-strength connecting rod as claimed in claim 20, wherein the steel further includes, on mass basis, at least one selected from the group consisting of 2.0% or less of Ni, 1.0% or less of Mo, and 0.0010 to 0.0030% of B.

22. A high-strength connecting rod as claimed in claim 19, wherein the high-strength connecting rod is formed of a steel including, on mass basis, 0.20 to 0.43% of C, 0.05 to 2.0% of Si, 0.30 to 1.40% of Mn, 0.07 to 0.15% of P, 2.5% or less of Cr, 0.05% or less of Al, 0.005 to 0.03% of N, and at least one selected from the group consisting of 0.03 to 0.5% of V, 0.005 to 0.5% of Nb and 0.005 to 0.5% of Ti, the balance being Fe and impurities.

23. A high-strength connecting rod as claimed in claim 20, wherein the steel further includes, on mass basis, at least one selected from the group consisting of 0.2% or less of S, 0.3% or less of Pb, 0.1% or less of Ca, and 0.3% or less of Bi.

24. A high-strength connecting rod as claimed in claim 19, wherein the high-strength connecting rod has been subjected to shot peening.

25. A method of producing the high-strength connecting rod of claim 19, the producing method comprising:
forming a material steel into a shape of the connecting rod;
hardening the material steel having the connecting rod shape by using induction current; and
tempering the hardened material steel at a temperature ranging from 200 to 650° C.

26. A producing method as claimed in claim 25, wherein the tempering is carried out at a temperature ranging from 350 to 550° C.

27. A producing method as claimed in claim 25, wherein the tempering is carried out by using induction current.

28. A high-strength connecting rod comprising:
a connecting beam section serving as a main body of the connecting rod, the connecting beam section having a portion which is the smallest in cross sectional area throughout the connecting rod;
a big end located at a first end side of the connecting beam section;
a small end located at a second end side of the connecting beam section, the second end side being axially opposite to the first end side;
a first joining section located between the connecting beam section and the big end to connect the connecting beam section and the big end; and
a second joining section located between the connecting beam section and the small end to connect the connecting beam section and the small end;
wherein each of the first and second joining sections gradually and continuously decreases in cross sectional area toward the connecting beam section;
wherein a cross section of each of the connecting beam section and each of the first and second joining sections includes at least one of martensitic structure and ferritic-pearlitic structure and satisfies the following expression:

$$S/D \geq 1/\{(1-\beta)Ms/100+\beta\} \quad \text{Eq.(1)}$$

where S is a cross sectional area of any portion of each of the connecting beam section and each of the first and second joining sections; D is a cross sectional area of the smallest cross sectional area portion of the connecting beam section; $\beta$ is a fatigue strength of an unhardened structure/a fatigue structure of a tempered martensitic structure; Ms is a proportion of area of the tempered martensitic structure in the portion whose sectional area is S;
wherein a whole cross section of the smallest cross sectional area portion is formed of the tempered martensitic structure.

* * * * *